United States Patent
Matsumoto et al.

(10) Patent No.: US 6,912,531 B1
(45) Date of Patent: Jun. 28, 2005

(54) IMAGE STORAGE METHOD AND APPARATUS

(75) Inventors: Kentaro Matsumoto, Higashikurume (JP); Kunihiro Yamamoto, Yokohama (JP); Kiyoshi Kusama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 132 days.

(21) Appl. No.: 09/628,135

(22) Filed: Jul. 28, 2000

(30) Foreign Application Priority Data

Jul. 30, 1999 (JP) ............................................. 11-217853

(51) Int. Cl.⁷ .............................................. G06F 17/30
(52) U.S. Cl. .............................. 707/10; 707/3; 707/101; 382/100
(58) Field of Search ................................ 707/101, 520, 707/10, 3, 1, 104.1; 341/76; 358/403, 500, 465; 382/100, 209, 115; 348/734

(56) References Cited

U.S. PATENT DOCUMENTS

| | | | | |
|---|---|---|---|---|
| 4,553,206 A | * | 11/1985 | Smutek et al. | 707/101 |
| 4,602,333 A | * | 7/1986 | Komori | 341/76 |
| 4,949,287 A | * | 8/1990 | Yamaguchi et al. | 707/520 |
| 5,461,682 A | * | 10/1995 | Nomura | 358/403 |
| 5,581,373 A | | 12/1996 | Yoshida | 358/468 |
| 5,585,944 A | * | 12/1996 | Rodriguez | 358/500 |
| 5,673,338 A | * | 9/1997 | Denenberg et al. | 382/209 |
| 5,838,463 A | * | 11/1998 | Gahang | 358/465 |
| 5,898,461 A | | 4/1999 | Ohsawa et al. | 348/415 |
| 6,088,402 A | | 7/2000 | White | 375/326 |
| 6,424,385 B1 | * | 7/2002 | Koyama et al. | 348/734 |

* cited by examiner

Primary Examiner—Charles L. Rones
Assistant Examiner—Hassan Mahmoudi
(74) Attorney, Agent, or Firm—Fitzpatrick, Cella, Harper & Scinto

(57) ABSTRACT

Since a plurality of image data are stored in a single file, high-speed access to image data and easy management of image data are allowed, and information that pertains to each image data can be acquired from a source outside the image file. As an arrangement for this purpose, an image data area (202) continuously stores a plurality of compressed image data. An index area (204) stores reference information to a source outside the file, which pertains to each of the plurality of image data stored in the image data area (202), in the order the plurality of image data are stored. A feature amount data area (203) stores feature amount data obtained from the images stored in the image data area (202). Furthermore, an image information area (201) stores header information including information indicating the start position of each area.

16 Claims, 15 Drawing Sheets

FIG. 4

| | | | | |
|---|---|---|---|---|
| R (0, 0) | G (0, 0) | B (0, 0) | NA | |
| R (1, 0) | G (1, 0) | B (1, 0) | NA | |
| R (2, 0) | G (2, 0) | B (2, 0) | NA | 401 FIRST IMAGE |
| R (0, 1) | G (0, 1) | B (0, 1) | NA | |
| R (1, 1) | G (1, 1) | B (1, 1) | NA | |
| R (2, 1) | G (2, 1) | B (2, 1) | NA | |
| R (0, 0) | G (0, 0) | B (0, 0) | NA | |
| | | | | 402 SECOND IMAGE |
| R (0, 0) | G (0, 0) | B (0, 0) | NA | |
| R (1, 0) | G (1, 0) | B (1, 0) | NA | |
| R (2, 0) | G (2, 0) | B (2, 0) | NA | N-TH IMAGE |
| R (0, 1) | G (0, 1) | B (0, 1) | NA | |
| R (1, 1) | G (1, 1) | B (1, 1) | NA | |
| R (2, 1) | G (2, 1) | B (2, 1) | NA | |

IMAGE STORAGE METHOD AND APPARATUS

FIELD OF THE INVENTION

The present invention relates to an image storage method and apparatus in an image database used to search a plurality of images for a desired one.

BACKGROUND OF THE INVENTION

Many image databases have been proposed to search a large number of image data for a desired image. Most of these databases are roughly categorized into two methods:

a method of relating non-image information such as a keyword, photographing date, and the like to images, and making a search based on such information; and a method of making a search based on feature amounts (luminance, color difference information, image frequency, histogram, and the like) of images themselves.

In either methods, query information and image data are normally managed separately. For example, query data are managed using a single file or relational database and actually undergo a search. File names of image data that match the query condition are obtained from the search results, and image data are accessed and displayed based on these file names. The reason why such method is used is that image data normally has a large size and it is efficient to manage such image data independently from query data.

Individual image data are managed in a file system, and two management methods are available. The first method manages all image data using a single directory. The second method divides image data into some groups each including a plurality of images, and classifies and manages image data in directories in units of groups.

For example, image data may be classified in directories based on their contents such as "animals", "flowers", and the like.

However, in both the first and second methods, when a plurality of images obtained as a result of a search using a query key or the like are to be displayed at the same time, if the number of images is large, image access requires a very long period of time.

In the first method, it is easy to manage images. However, if the number of images is too large, a very long time is required to acquire only directory information. In the second method, correspondence between image files and directories must be correctly maintained, and management such as file movement or the like is troublesome.

The present inventors previously proposed a technique for storing a plurality of images and their feature amount data in a single file in, e.g., U.S. application Ser. No. 09/384,965. This technique can search for an image with highest similarity on the basis of the feature amounts of an image as query keys and a plurality of images as test images, and can display an image as a search result at high speed.

However, in the above proposal, the data size of an image file becomes very large with increasing number of images included in the image file. To solve this problem, individual image data included in the image file must have a relatively low resolution. As a result, even when such image is output to a high-resolution printer, it becomes difficult to obtain a high-quality image output.

SUMMARY OF THE INVENTION

The present invention has been made in consideration of the aforementioned problems, and has as its object to allow high-speed access to image data and easy management of image data by storing a plurality of image data in a single file, and to offer various services by allowing to acquire information that pertains to each image data from a source outside the image file.

For example, as the information that pertains to image data, image data with higher resolution is specified, thus obtaining a high-quality image output.

In order to achieve the above object, an image storage method according to the present invention comprises, e.g., the following steps.

That is, an image storage method comprises:

the image storage step of continuously storing a plurality of image data in a first area of a single file; and the reference information storage step of storing reference information to a source outside the file, which pertains to each of the plurality of image data stored in the image storage step, in a storage order of the plurality of image data in a second area of the file.

Also, according to the present invention, an image storage apparatus that implements the image storage method is provided. Furthermore, according to the present invention, a storage medium that stores a file generated by the image storage method, and a storage medium that stores a control program for making a computer implement the image storage method are provided.

It is another object of the present invention to provide an image storage apparatus, storage medium, and control program, which allow easy handling of an image file, and allow the user to use an image with high image quality.

It is still another object of the present invention to provide a novel function.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows details of the data configuration in a feature amount data area 203 shown in FIG. 2;

DESCRIPTION OF THE PREFERRED EMBODIMENTS

A preferred embodiment of the present invention will be described hereinafter with reference to the accompanying drawings.

[First Embodiment]

Figure 1:
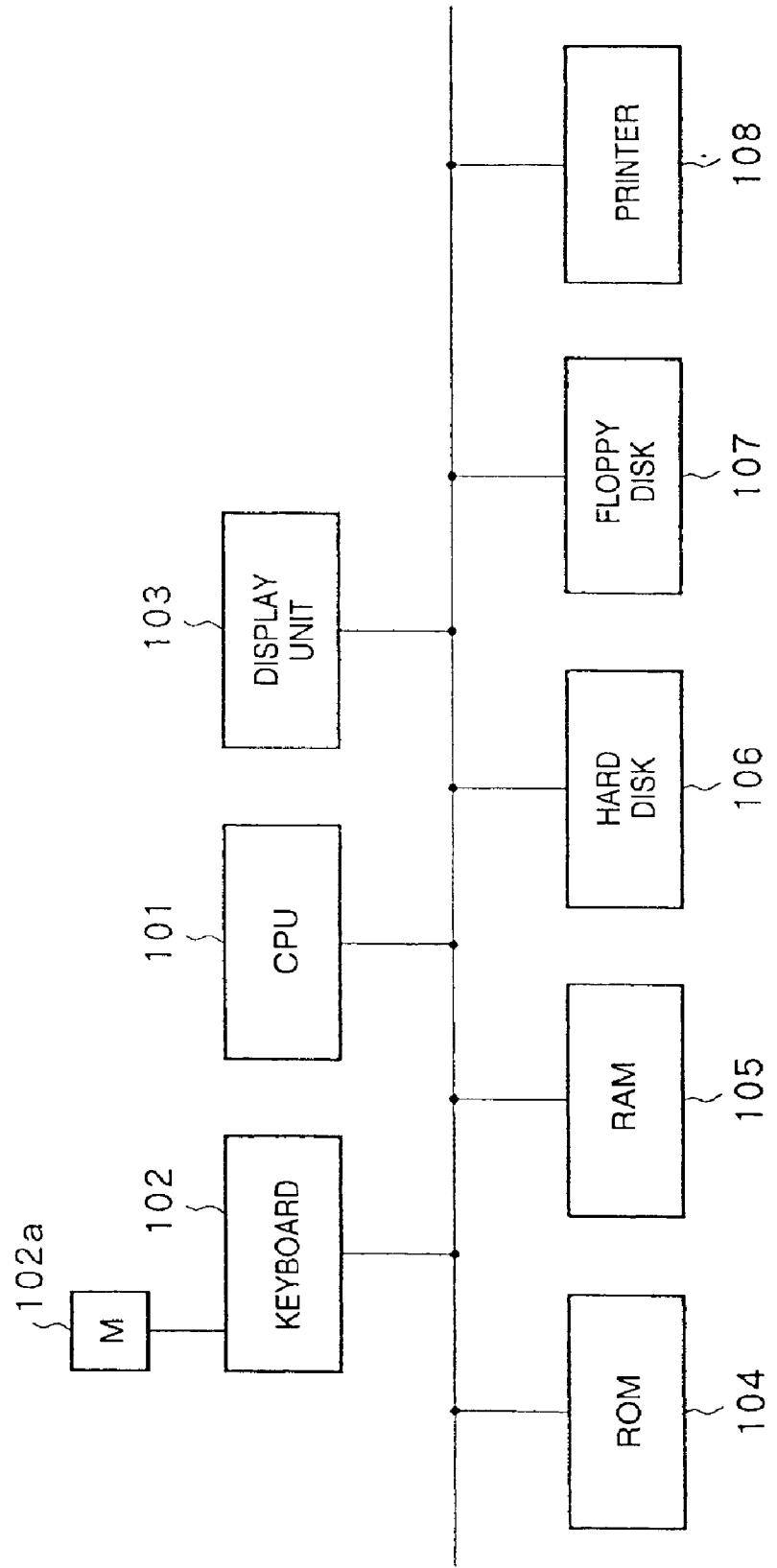
FIG. 1 is a block diagram showing the arrangement of a computer system as an image storage apparatus according to an embodiment of the present invention.

FIG. 1 is a block diagram showing the arrangement of a computer system as an image storage apparatus according to this embodiment. Referring to FIG. 1, reference numeral 101 denotes a CPU which controls the overall system. Reference numeral 102 denotes a keyboard which is used to make operation inputs to the system together with a mouse 102a. Reference numeral 103 denotes a display unit which comprises a CRT, liquid crystal display, or the like. Reference numeral 104 denotes a ROM; and 105, a RAM, which forms a storage device of the system and stores programs to be executed by the system, and data used by the system. Reference numeral 106 denotes a hard disk device; and 107, a floppy disk device, which constructs an external storage device used by a file system of the system. Reference numeral 108 denotes a printer, which forms a visible image on a recording medium on the basis of image data.

Note that processes such as creation of an image file and the like to be described below are implemented when the CPU 101 executes control programs stored in the ROM 104 or RAM 105. Also, an image file formed in the following description is finally stored in the external storage device such as the hard disk 106, floppy disk 107, or the like.

Figure 2:
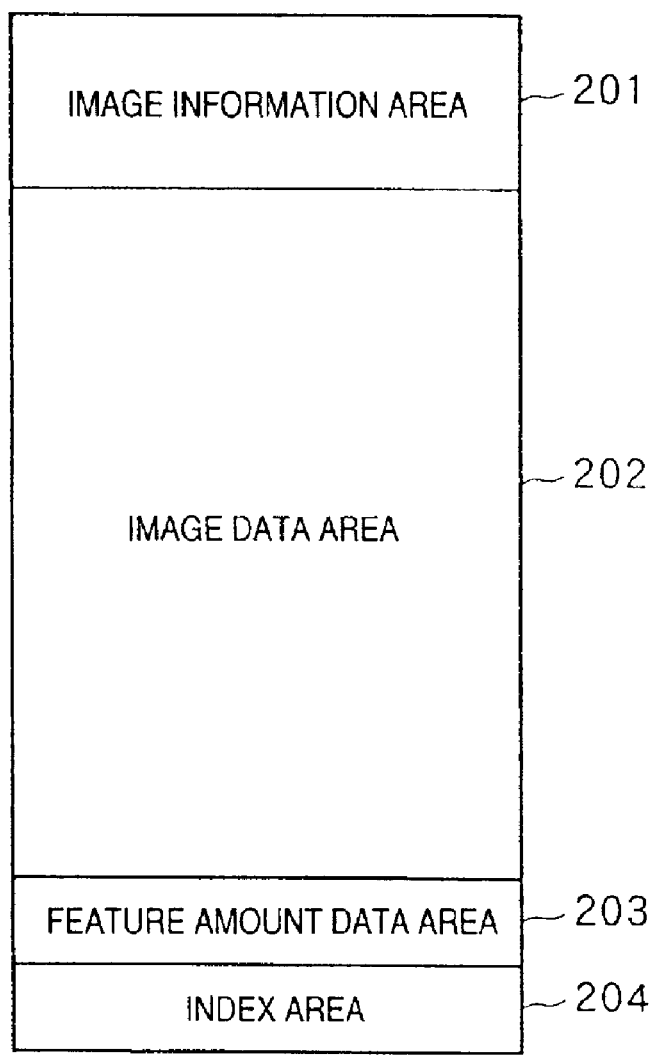
FIG. 2 shows a schematic format of an image file created by an image storage method according to the first embodiment of the present invention.

FIG. 2 shows a schematic format of an image file created by an image storage method according to the first embodiment. Referring to FIG. 2, reference numeral 201 denotes an image information area (also referred to as a header area), which stores information required for reading out and displaying images, such as the number of images, a compression scheme, the numbers of vertical and horizontal pixels of individual images, feature amount extraction methods of individual images, and the like. Reference numeral 202 denotes an image data area which continuously stores all image data to be stored as the image file. Reference numeral 203 denotes a feature amount data area which continuously stores feature amounts (luminance, color difference information, image frequency, histogram, and the like) of a plurality of images stored in the image data area 202. Reference numeral 204 denotes an index area which continuously records reference information to associated information of each of all image data stored in the image data area 202.

Figure 3:
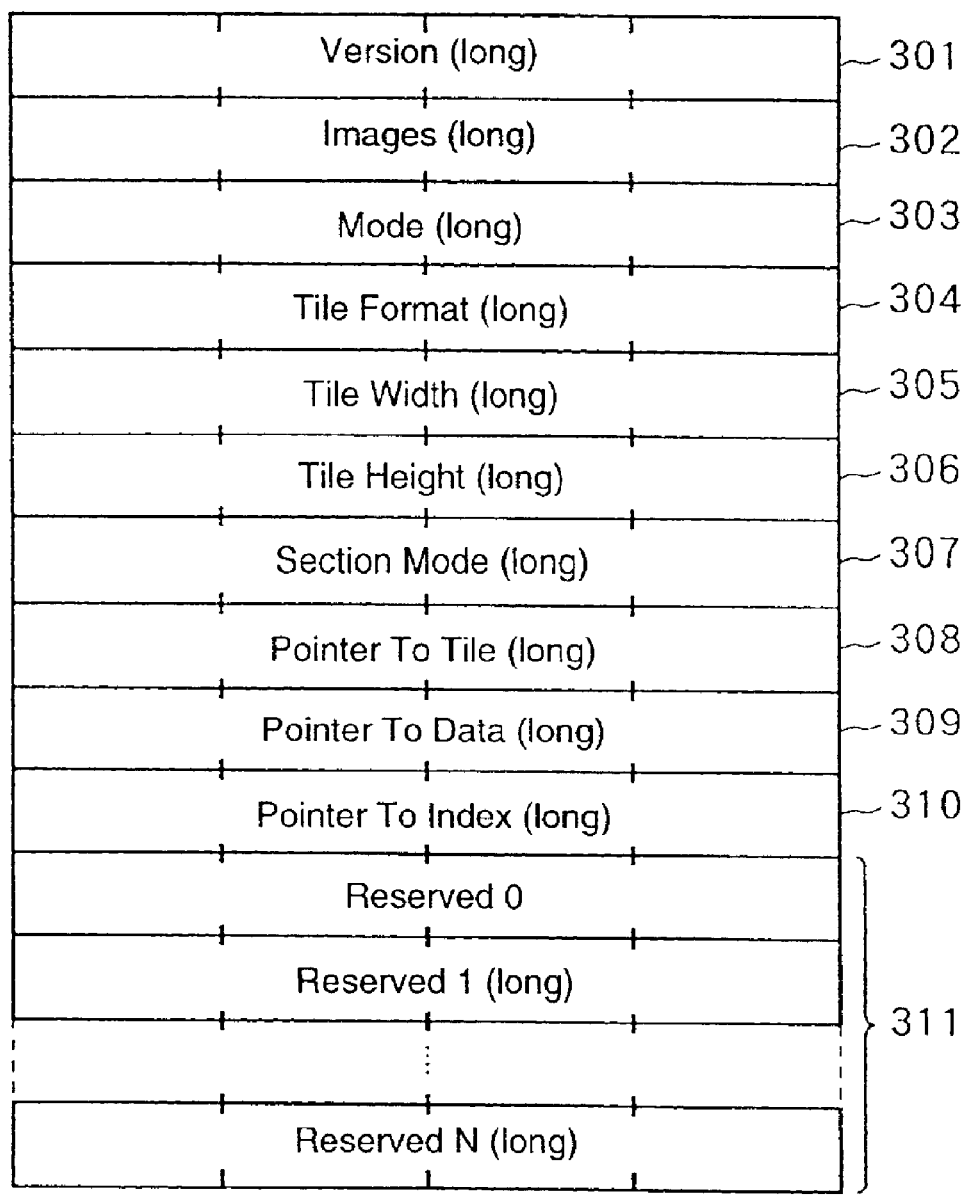
FIG. 3 shows details of the data configuration of an image information area 201 shown in FIG. 2.

FIG. 3 shows details of the data configuration of the image information area 201 shown in FIG. 2. In this example, 4-byte fields are assured in this area, but the field size can be changed in correspondence with the number or sizes of images to be stored.

A field 301 stores "Version" indicating the revision number of this image format. A field 302 stores "Images" indicating the total number of recorded images. A field 303 stores "Mode" indicating values used as image feature amounts. A value "0" is set in "Mode" when the image feature amount uses an RGB value as color difference information; a value "1" is set in "Mode" when the image feature amount uses a YUV value, thus indicating the type of image feature amount. A field 304 stores "TileFormat" indicating the formats of images stored in the image data area 203. "TileFormat" stores a value "0" for an image compressed by JPEG; "1" for BMP (bitmap); and "2" for FlashPix™.

Fields 305 and 306 respectively store "TileWidth" and "TileHeight" which respectively indicate the width and height of each image stored in the image data area 203. Note that these values are expressed by the number of pixels. A field 307 stores "SectionMode" indicating the screen division method upon computing a feature amount. In this example, a value "0" is set when an image is divided into six regions, as will be described later, or a value "−1" is set when an image is not divided.

A field 308 stores a pointer "PointerToTile" indicating the start address of the image data area 202. For example, when the image data area 202 follows the image information area 201 without any gap, since the size of the image information area 201 is 64 bytes in this example, the value of the image data area pointer 308 is 64.

A field 309 stores a pointer "PointerToData" indicating the start address of the image feature amount data area 203. A field 310 stores a pointer "PointerToIndex" indicating the start address of the index area 204. A field 311 is an auxiliary field, which is assured to have a size of N×4 bytes.

Note that the order of information in the aforementioned fields 301 to 311 is not limited to this example.

FIG. 4 shows details of the data configuration in the feature amount data area 203 in FIG. 2. Reference numerals 401 and 402 denote feature amounts computed from the first and second images among a plurality of images. Note that the computation method of image feature amounts will be explained later. In FIG. 4, a total of 18 data R(0, 0) to B(2, 1) express feature amounts of one image. R(0, 0), G(0, 0), and B(0, 0) indicate the R, G, and B average values of the upper left corner region (to be described later using FIG. 10) of six-divided regions of one image.

Note that "NA" in FIG. 4 indicates an insignificant value. In this embodiment, each of the R, G, and B average values is expressed by 1 byte, and 4 bytes are used as one unit. As another method, NA fields may be removed, and only R, G, and B values may be stored.

Figure 5:
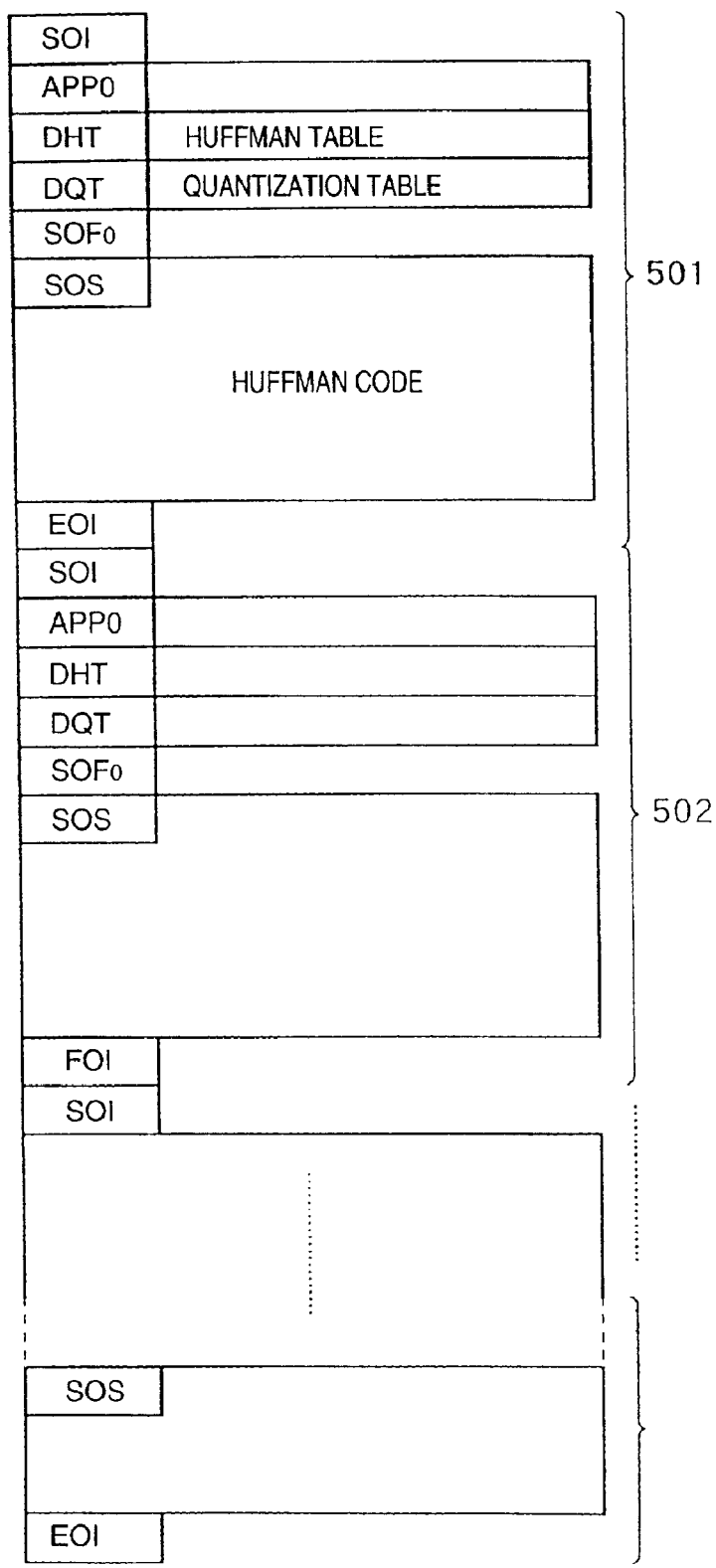
FIG. 5 shows details of the data configuration in an image data area 202 shown in FIG. 2.

FIG. 5 shows details of the data configuration in the image data area 202 shown in FIG. 2. FIG. 5 shows a case wherein JPEG is used as an image compression scheme. In this case, the field 304 (TileFormat) that stores information indicating the image format in the image information area 201 stores information indicating JPEG.

Referring to FIG. 5, reference numeral 501 denotes JPEG-compressed data of the first image among image data; and 502, JPEG-compressed data of the second image. In FIG. 5, SOI, APP0, DHT, DQT, SOF0, SOS, and EOI are partition symbols called markers. SOI indicates the start of JPEG data; EOI, the end of data; APP0, an area that an application can arbitrarily use; DHT, a Huffman table; DQT, a quantization table; SOF0, baseline JPEG compression; and SOS, Huffman codes. Compressed data of one image corresponds to a portion bounded by SOI and EOI. Refer to ITU-T WHITE BOOK digital still image compression coding recommendations (The ITU Association of Japan, Inc.) for JPEG. In the example in FIG. 5, JPEG data is used, but other image file formats such as BMP, FlashPix™, and the like may be used.

Figure 6:
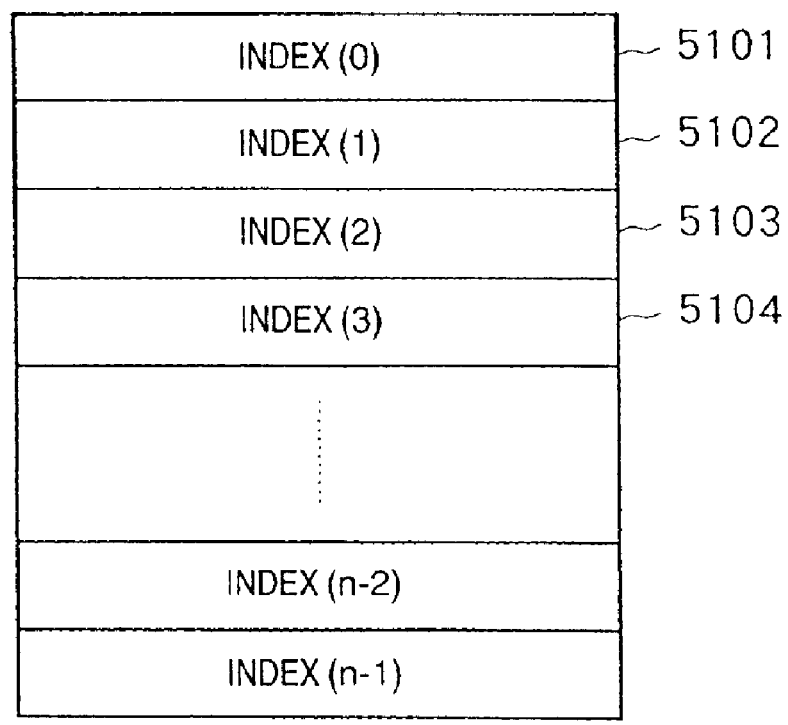
FIG. 6 shows details of the data configuration in an index area 204 shown in FIG. 2.

FIG. 6 shows details of the data configuration in the index area 204 in FIG. 2. Referring to FIG. 6, reference numeral

5101 denotes a field for storing reference information to information that pertains to the first image. Likewise, the area 204 sequentially stores reference information to information that pertains to each of N image data in fields 5102, 5103, . . . , as shown in FIG. 6.

A processing sequence for writing data on the hard disk 106 or floppy disk 107 in the format with the aforementioned configuration to create an image file will be explained below. Note that a case will be explained below wherein the version number as the revision number of this image format is 3, the number of images is 100, the feature amount mode is RGB, the image format is JPEG, the image size is width×height= 384×256, and feature amount extraction is done in the division mode (six-division).

Figure 7:
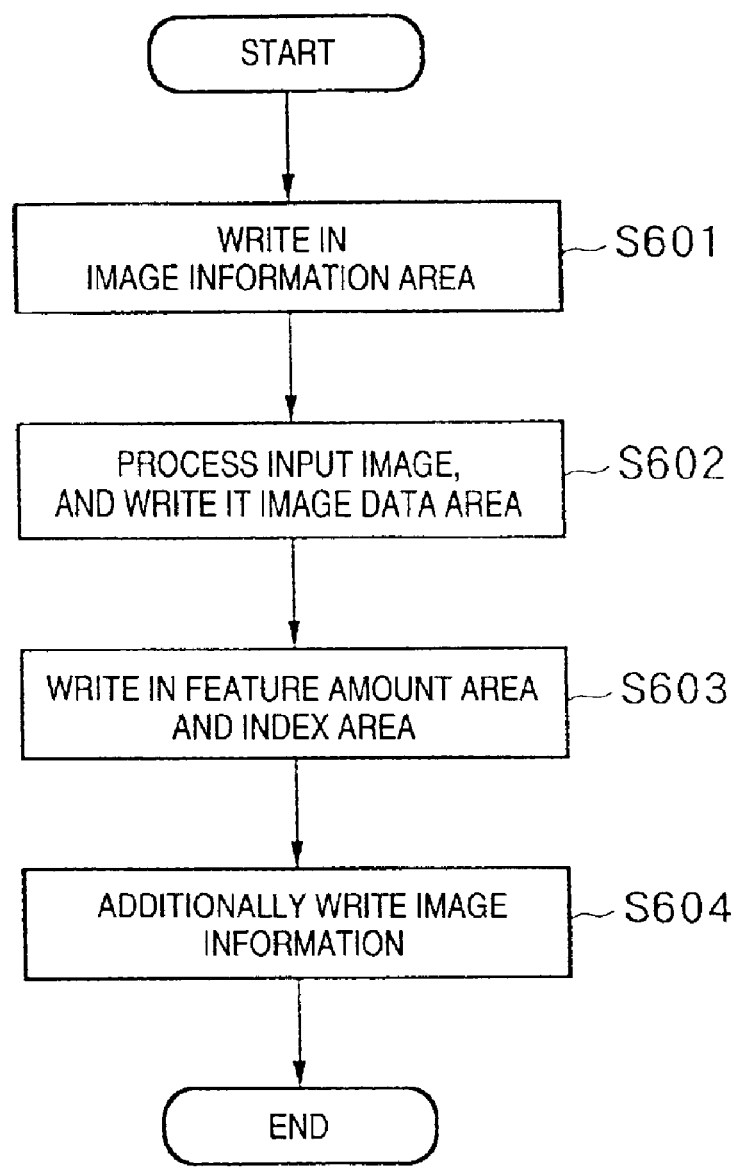
FIG. 7 is a flow chart showing an outline of an image file generation process in the first embodiment.

FIG. 7 is a flow chart showing an outline of an image file generation process in the first embodiment. Referring to FIG. 7, header data such as the version number, the number of images, mode, and the like are written in the image information area 201 in step S601. In step S602, each image data is read, undergoes processes such as feature amount extraction and the like, and is written in the image data area 202. In this embodiment, image data is compressed by JPEG, but the presence/absence of compression or the image data format is not limited to such specific example. In step S603, image feature amount data and index data obtained in step S602 are respectively written in the feature amount data area 203 and index data area 204. In step S604, information which remains unwritten in step S601 is additionally written in the image information area 201 upon receiving the processing result in step S602.

The processes shown in FIG. 7 will be described in more detail below.

{Description of Step S601}

Figure 8:
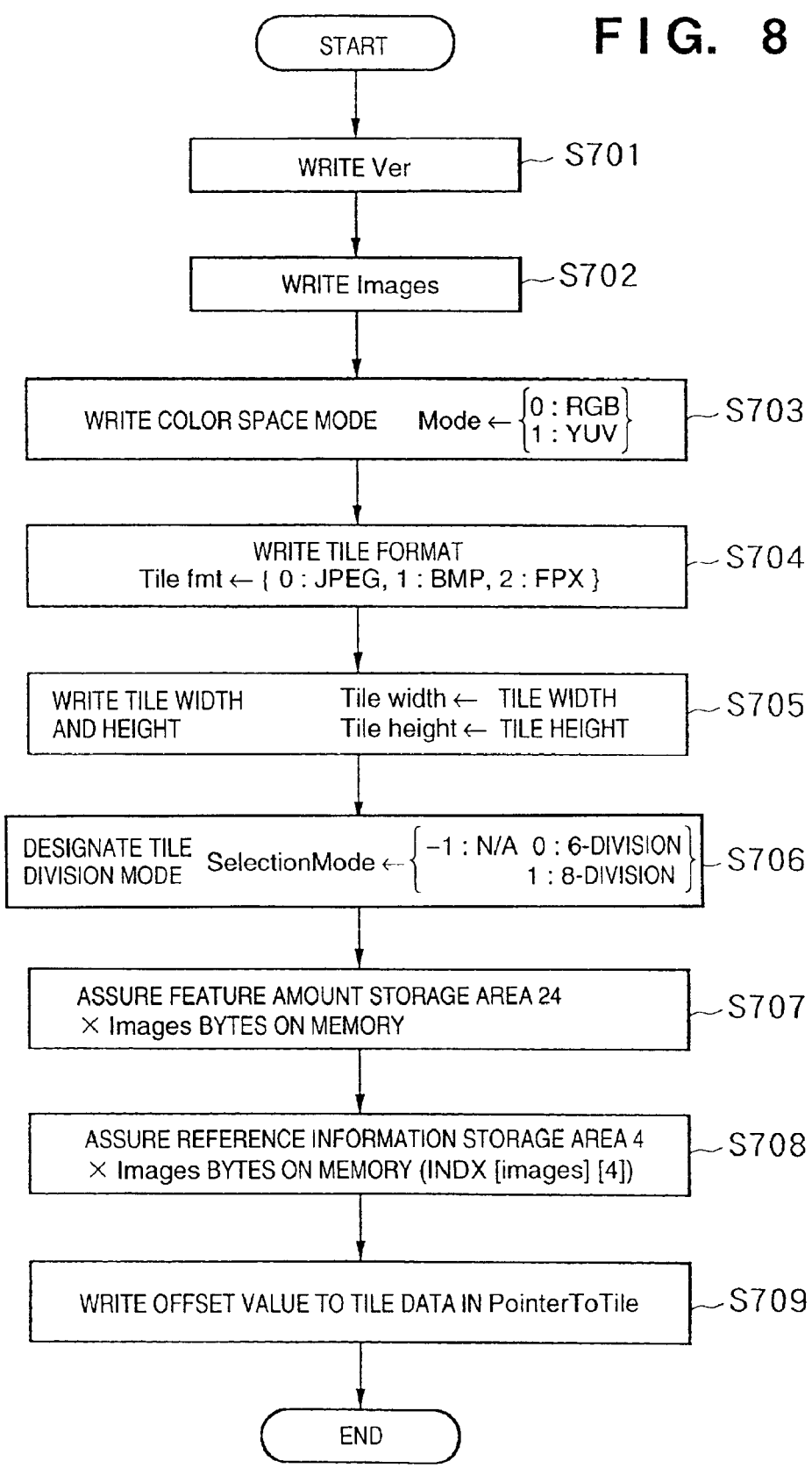
FIG. 8 is a flow chart for explaining a header data write process in step S601 shown in FIG. 7 in detail.

FIG. 8 is a flow chart for explaining the header data write process in step S601 shown in FIG. 7 in detail. Note that the image file in which data is to be written is already opened upon executing this process.

In step S701, a value indicating "Version" ("3" in this embodiment) is written in the field 301 in the image information area 201. In step S702, the number of images ("100" in this embodiment) to be stored in the image file is written in the field 302 (Images). In step S703, "0" (RGB) or "1" (YUV) is written as the mode of image feature amounts in the field 303 (Mode) (since this example uses RGB, a value "0" is written). In step S704, a value "0" (indicating JPEG) is written in the image format field 304 (TileFormat) in the image data area 203. Note that "tile" in the flow chart indicates each image to be stored in the image data area. In step S705, the image width (TileWidth) ("384" in this embodiment) and image height (TileHeight) ("256" in this embodiment) are respectively written in the fields 305 and 306. In step S706, a value indicating the division mode upon computing image feature amounts is written in the field 307 (SectionMode). In this embodiment, "−1" is stored for the non-division mode; "0" for the 6-division mode; and "1" for the 8-division mode. Since this example uses the 6-division mode, a value "0" is written in the field 307.

In step S707, an area for temporarily storing feature amount data stored in the image file is assured on the memory (RAM 105). In this embodiment, since feature amount data that uses a 24-byte area per image is stored, the area to be assured on the memory is 24 bytes×the number of images. Note that the number of images is "Images" set in the field 302 in step S702. The area assured in this step is handled as a two-dimensional matrix D[Images][24], i.e., Images×24 (to be referred to as a matrix D hereinafter).

In step S708, an area for temporarily storing reference information of each image is assured on the memory. In this embodiment, since a 4-byte field is used per image, the area to be assured on the memory is 4 bytes×the number of images. Note that the number of images is "Images" set in the field 302 in step S702. The area assured in this step is handled as a two-dimensional matrix INDX[Images][4], i.e., Images×4 (to be referred to as a matrix INDX hereinafter).

In step S709, the start address pointer of the image data area 202 is written in the field 308 (PointerToTile). In this embodiment, since the image information area 201 consists of 64 bytes and the image data area is allocated immediately after the area 201, a value "64" is written.

{Description of Step S602}

Figure 9:
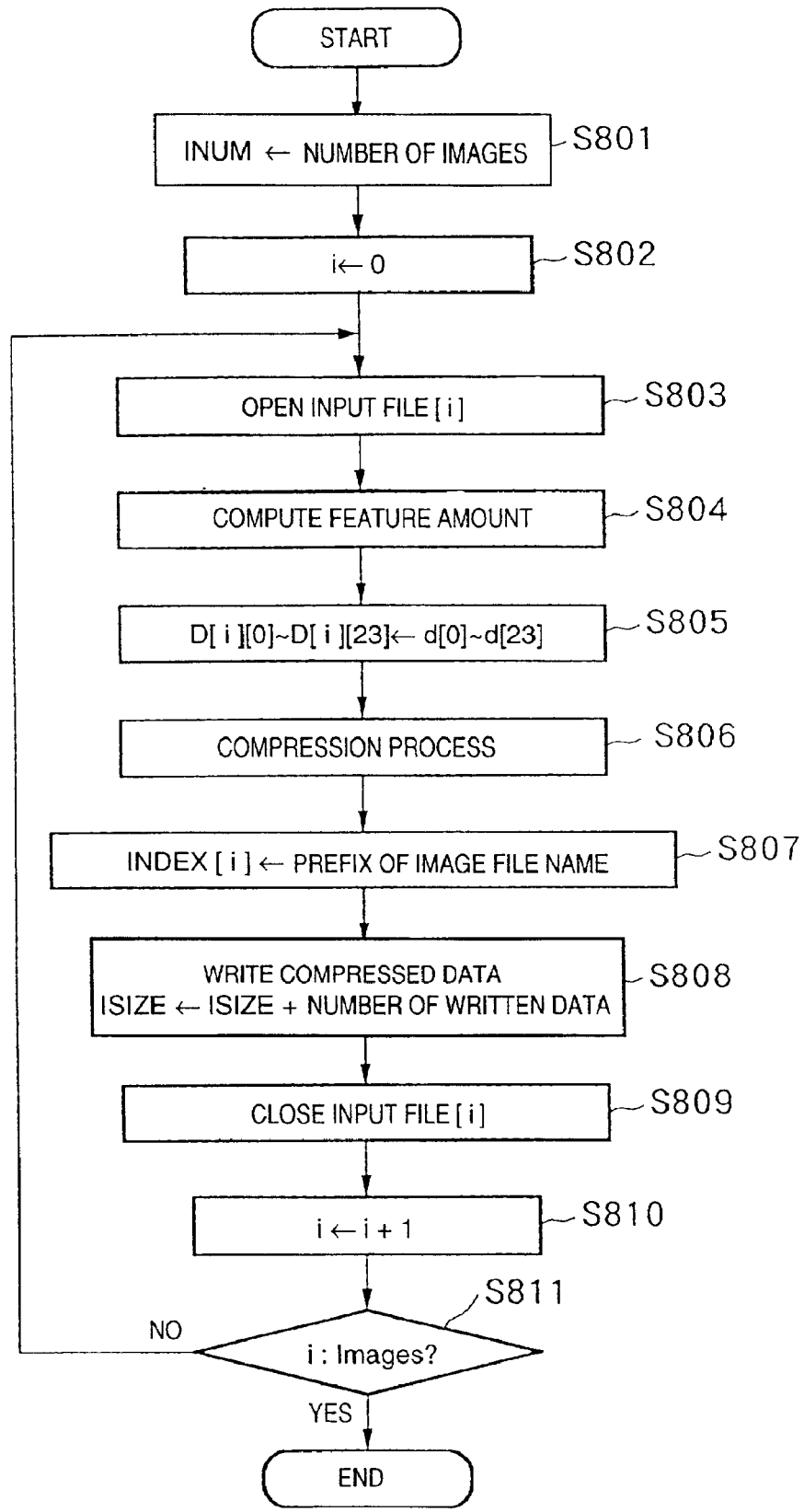
FIG. 9 is a flow chart for explaining a detailed sequence of a process in step S602 in FIG. 7.

FIG. 9 is a flow chart for explaining a detailed sequence of the process in step S602 in FIG. 7.

In FIG. 9, each of a plurality of input image files is opened, and each image undergoes computation of an image feature amount and a compression process. Furthermore, since image data are continuously stored in the file, the compressed image data size of each image is computed, and is added to the start position of the image data area 202, thus computing the start position of each image. After that, the compressed image data is written in the image data area 202 to complete the process for one input image, and the file is closed. This process is repeated for all input images.

In step S801, the value indicating the total number of images (the value stored in the field 301 (Images); 100 in this example) is set in a variable INUM. In step S802, a variable i is reset to zero.

In step S803, an input file (i) is opened. In step S804, feature amounts are computed from the opened image. In this process, as will be described in detail later, the computed feature amounts consist of 18 feature amount data, as described above using FIG. 4, but 24 feature amounts d[0] to d[23] including six "NA" data are computed. In step S805, feature amount data d[0] to d[23] obtained in step S804 are stored in elements d[i][0] to D[i][23] of the matrix D in the feature amount storage area assured in step S707.

In step S806, the image opened in step S803 is compressed by JPEG. In step S807, the file name of the input file (i) of interest is written in INDX[i][0] to INDX[i][3] as reference information. In step S808, compressed image data is written in the file, and the number of written bytes is added to ISIZE. In step S809, the input file (file (i)) opened in step S803 of this loop is closed. In step S810, i is incremented by 1. In step S811, i is compared with INUM. If i≠INUM, the flow returns to step S803 to start the process of the next input image. On the other hand, if i=INUM, since all INUM image files have been processed, this process ends.

{Description of Step S804}

Computation of image feature amounts in step S804 described above will be explained.

Figure 10:
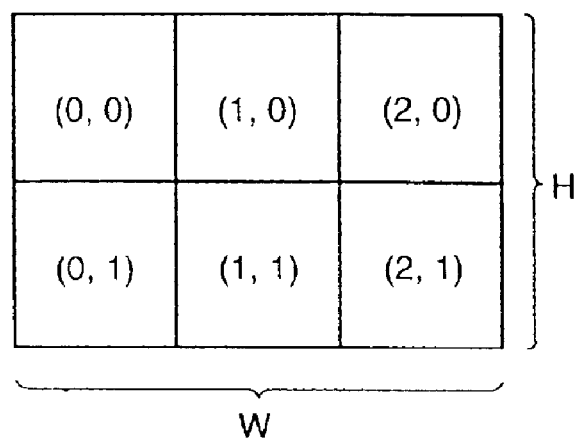
FIG. 10 is a view showing screen division upon computing a feature amount in the first embodiment.

FIG. 10 shows screen division upon computing feature amounts in this embodiment. As shown in FIG. 10, the size of an image of interest is W pixels in the horizontal direction×H pixels in the vertical direction. In this embodiment, this image is divided into three regions in the horizontal direction×two regions in the vertical direction, i.e., a total of six regions, which are defined as region (0, 0), region (1, 0), . . . , region (2, 1) in turn from the upper left one. In this embodiment, the R, G, and B average values of these regions are computed, and 18 numerical values are used as feature amounts of the image of interest.

Figure 11:
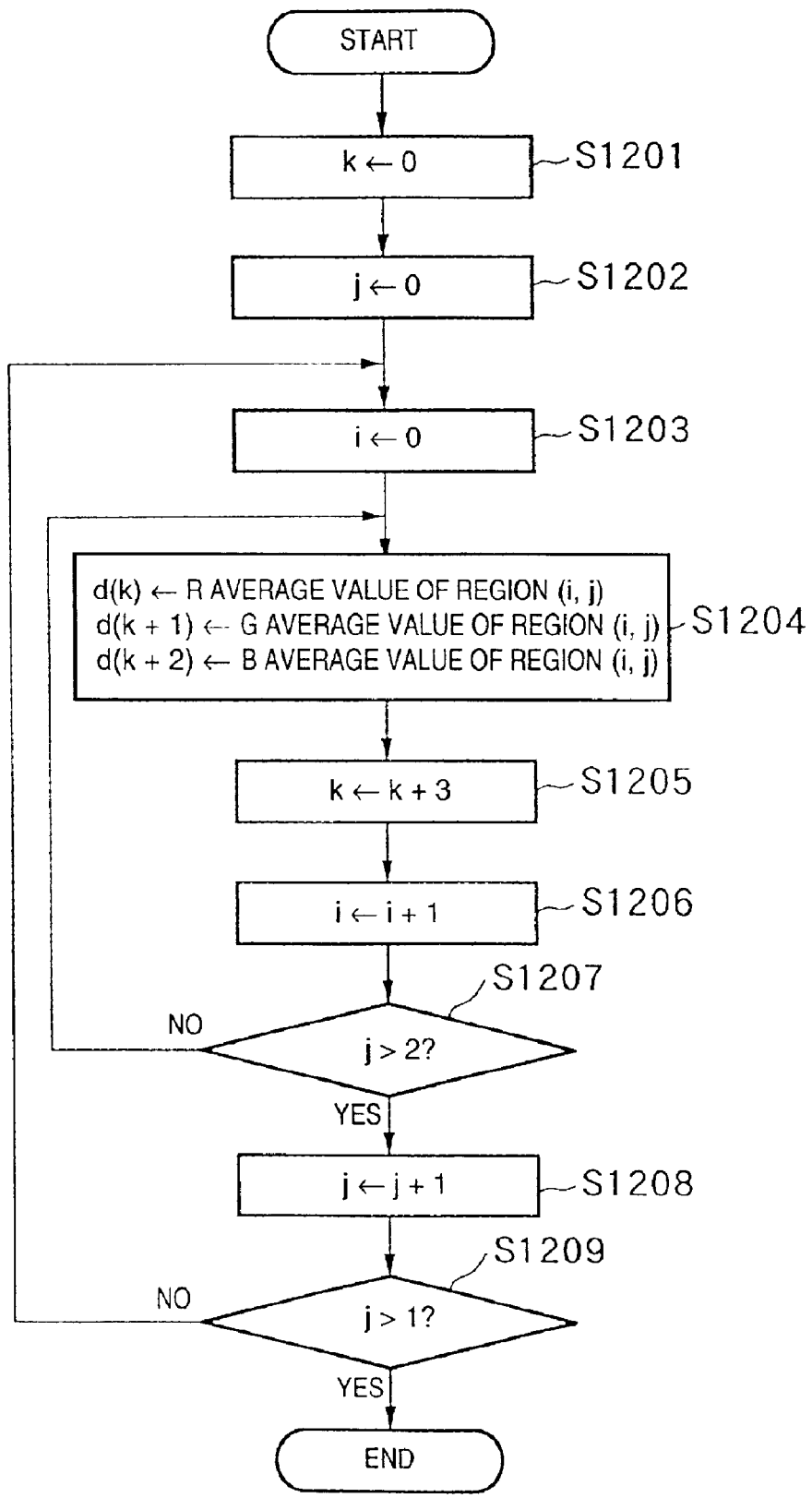
FIG. 11 is a flow chart for explaining a feature amount computation process in the first embodiment.

FIG. 11 is a flow chart for explaining the feature amount computation process according to this embodiment. A variable k is reset to a value "0" in step S1201, a variable j is reset to a value "0" in step S1202, and a variable i is reset to a value "0" in step S1203.

In step S1204, the R average value of region (i, j) is substituted in the k-th element d[k] of matrix d. Also, the G and B average values are respectively substituted in d[k+1] and d[k+2]. Note that the computation method of the R, G, and B average values will be described later using the flow chart in FIG. 12.

In step S1205, k is incremented by "3". In step S1206, i is incremented by "1". In step S1207, i is compared with a value "2". If i>2, the flow advances to step S1208; otherwise, the flow returns to step S1204.

If i>2, since it indicates that the process for the divided row of interest is complete, the control enters the next divided row. Hence, j is incremented by "1" in step S1208. In step S1209, j is compared with a value "1". If j>1, since it indicates that the process for the second divided row is complete, i.e., the process for the overall screen is complete, this process ends. Otherwise, the flow returns to step S1203 to execute the process for a new divided row.

Upon completion of the aforementioned process, the image feature amounts of an image are stored in matrix d[ ] having 18 elements.

Note that the image is divided into six rectangular regions having equal areas to compute feature amounts. However, the shape of each divided region is not limited to the rectangular shape but may be a more complicated shape, and the number of divided regions may be increased/decreased. As can be easily understood from the above description, when the number of divided regions is increased/decreased, the number of elements as the feature amounts is not 18 but increases/decreases accordingly.

Figure 12:
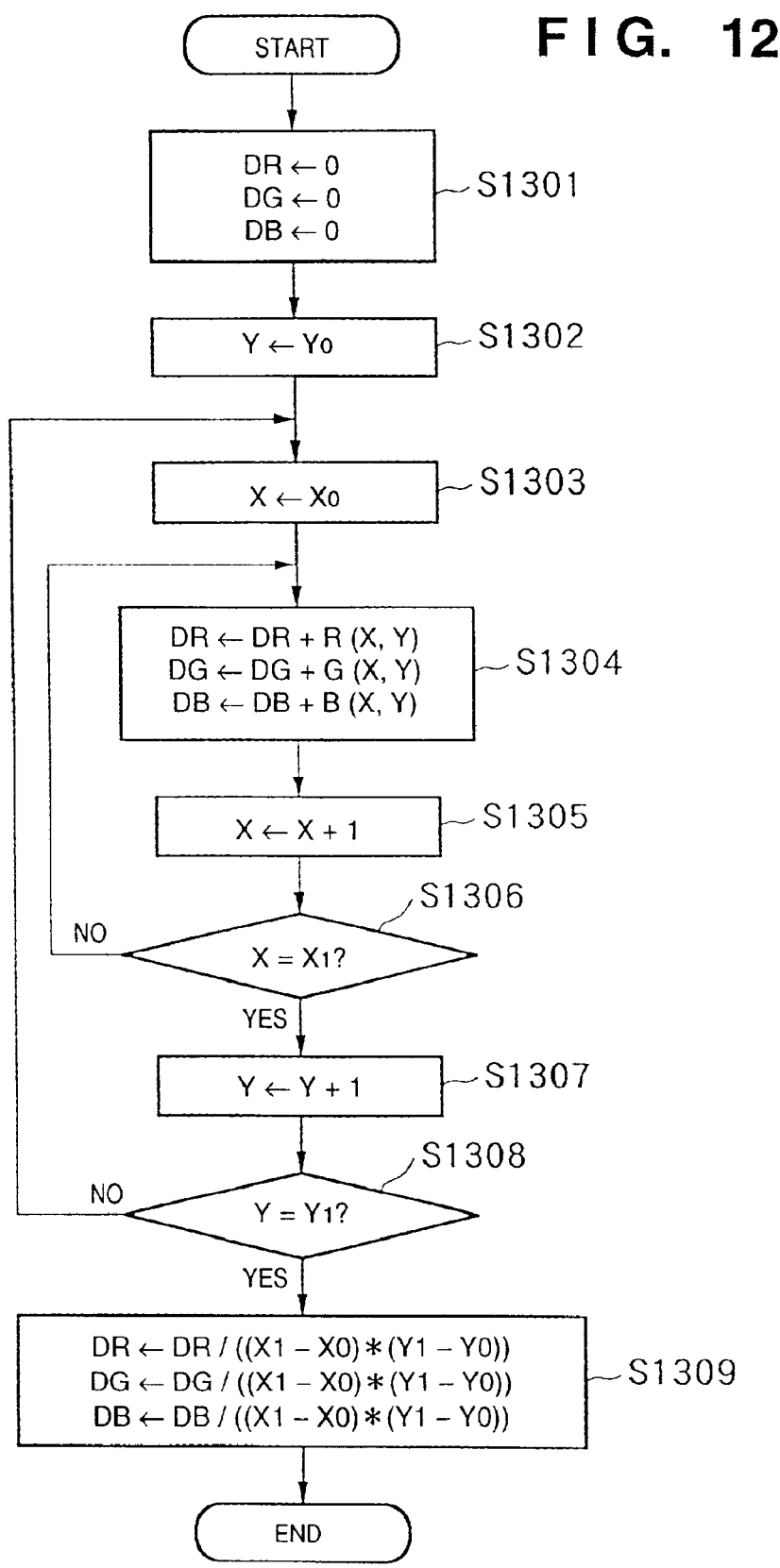
FIG. 12 is a flow chart for explaining an average value computation method of R, G, and B values in units of regions.

The computation method of the R, G, and B average values will be described in more detail below. FIG. 12 is a flow chart for explaining the computation method of the R, G, and B average values of each region. Note that image data is stored in three sequences R(X, Y), G(X, Y), and B(X, Y). In this case, $0 \leq X < W$ and $0 \leq Y < H$, and the upper left corner of an image is set as an origin (0, 0).

In the process shown in FIG. 12, the average density values of a partial region defined by $X_0 \leq X < X_1$ and $Y_0 \leq Y < Y_1$ are computed, R, G, and B average values are substituted in variables DR, DG, and DB, and the variables DR, DG, and DB are returned.

In step S804 and the process shown in FIG. 11, since a region corresponding to region (i, j) corresponds to:

$X_0 = W \times i/3, X_1 = W \times (i+1)/3$ $Y_0 = H \times j/2, Y_1 = H \times (j+1)/2$ constants $X_0$, $X_1$, $Y_0$, and $Y_1$ are initialized, as described above, and the flow chart shown in FIG. 12 is then executed.

In step S1301, variables DR, DG, and DB are reset to a value "0". In step S1302, a variable Y is reset to $Y_0$ mentioned above. Likewise, a variable X is reset to $X_0$ mentioned above in step S1303.

In step S1304, R(X, Y) is added to DR. Likewise, G(X, Y) is added to DG, and B(X, Y) is added to DB. In step S1305, the variable X is incremented by a value "1". In step S1306, the variable X is compared with $X_1$. If $X = X_1$, the flow advances to step S1307; otherwise, the flow returns to step S1304. In step S1307, the variable Y is incremented by a value "1". In step S1308, the variable Y is compared with $Y_1$. If $Y = Y_1$, the flow advances to step S1309; otherwise, the flow returns to step S1303. With the processes in steps S1303 to S1308 described above, the total values of R values, G values, and B values within the region specified by $X_0$, $X_1$, $Y_0$, and $Y_1$ are respectively stored in DR, DG, and DB.

In step S1309, the variables DR, DG, and DB are respectively divided by $(X_1 - X_0) \times (Y_1 - Y_0)$. This process indicates that the values stored in the variables are divided by the number of pixels in the region, i.e., the average values are computed. Therefore, with the process in step S1309, the contents of DR, DG, and DB are average density values obtained by dividing the sum totals of the pixel density values in the region by the number of pixels.

{Description of Step S603}

The data write process in the feature amount data area 203 and index area 204 in step S603 in FIG. 7 will be described below.

Figure 13:
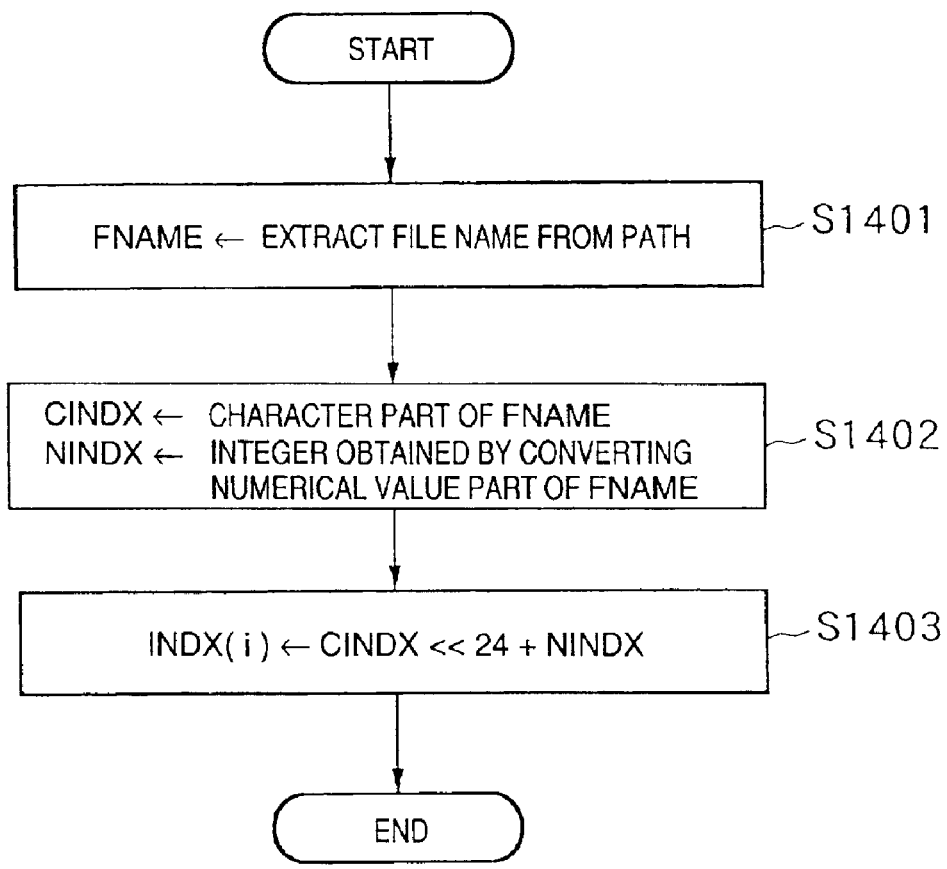
FIG. 13 is a flow chart for explaining a reference information (index data) storage process in step S807 in FIG. 9 in detail.

Index data to be written in the index area 204 is generated in step S807 in FIG. 9 described above. FIG. 13 is a flow chart for explaining the storage process of reference information (index data) in step S807 in FIG. 9 in detail.

In step S1401, for example, if the full-path file name of an original file (input file) is C:¥tmp¥C12345.jpg, a character string "C12345" is extracted from this file name.

In step S1402, "C12345" is separated into alphabet part "C" and numerical value part "12345", and the alphabet part is converted into an ASCII code which is substituted in CINDX. In this example, a value "0x43" is stored. The numerical value part is converted into an integer without any sign, and lower 24 bits are substituted in NINDX.

In step S1403, a value obtained by shifting CINDX to the left by 24 bits, and then adding the value NINDX thereto (a total of 4 bytes=32 bits) is substituted in the memory area INDX[i][0] to INDX[i][3] assured in step S708.

Figure 14:
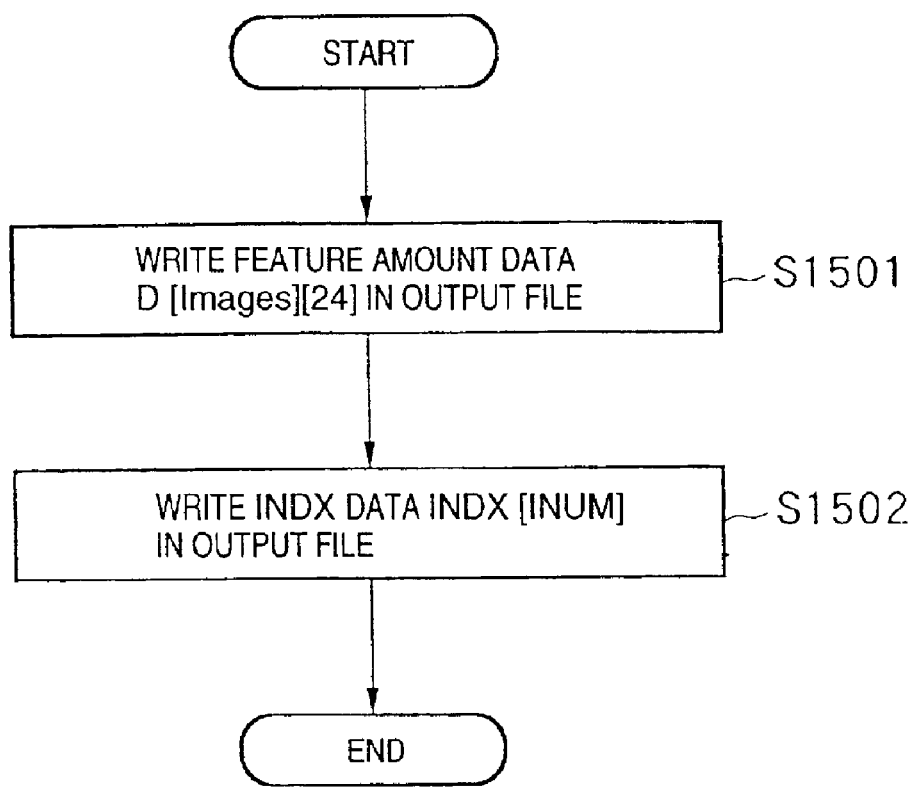
FIG. 14 is a flow chart for explaining a data write process in the feature amount area and index area in step S603 in FIG. 7.

FIG. 14 is a flow chart for explaining the data write process in the feature amount area and index area in step S603 in FIG. 7. In this process, feature amount data and index data are written.

Upon completion of step S602, the access pointer to the file is located at the trailing end of the image data area. Hence, the feature amount data D[Images][24] acquired in step S805 are written in an output file in step S1501. As a result, feature amount data are stored in the area 203 in FIG. 2 to follow the image data area. In step S1502, index data INDX[Images][4] acquired in step S1403 are written in the output file. As a result, the index area 204 is formed to continue from the trailing end of the feature amount data area 203.

{Description of Step S604}

Figure 15:
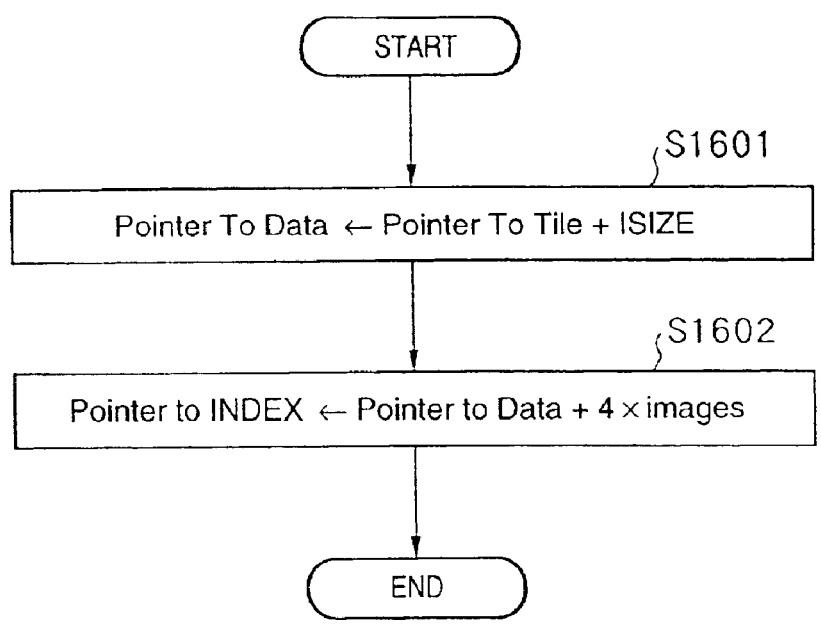
FIG. 15 is a flow chart for explaining an image information additional write process in step S604 in FIG. 7.

FIG. 15 is a flow chart for explaining the image information additional write process in step S604 in FIG. 7. In this process, data are written in unwritten fields in the image information area 201. In step S1601, PointerToTile+ISIZE is written in the field 309 (PointerToData). Note that the values PointerToTile and ISIZE are respectively set in steps S709 and S808. Subsequently, in step S1602 a value PointerToData+4×Images is written in the field 310 (PointerToINDX).

As described above, according to the first embodiment, since means for writing, in a single file, header information that describes information required for reading out and displaying images, an image data area that continuously stores all images, a feature amount data area that stores feature amounts of all the images, and an index area that stores information which pertains to each image, e.g., the location of data with higher resolution than that image, an image with higher resolution than those in a database can be referred to, and high-resolution print can be done as needed.

In the above embodiment, the file name is recorded in the index area 204 while being separated into 1-byte symbol part (alphabet) and 3-byte numerical value part. However, this is merely an example for limiting the size of the index area 204 to 4 bytes, and the tile name may be stored in other description formats. Also, a URL for accessing a server that stores high-resolution images via the Internet may be directly recorded as an ASCII code. In this manner, the URL can be directly substituted, and substitution in the index area or reference from the index area can be easily made. In this case, each index area must be expanded to, e.g., 64 bytes.

In the above embodiment, information to be written in the index area is not limited to still image information. For example, an arbitrary image frame of an AVI file may be designated. In this case, image data corresponding to image frames extracted from one or a plurality of AVI files are stored in the image data are 202, and the AVI file names and frame designation information corresponding to the stored images are stored in the index area 204. In this manner, an AVI file can be searched using a representative frame of a continuous scene of a moving image, or a given scene of a moving image file can be designated and played back based on the search result.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, since a plurality of image data are stored in a single file, high-speed access to image data and easy management of image data are allowed, and information that pertains to each image data can be acquired from a source outside the image file, thus providing various services.

As many apparently widely different embodiments of the present invention can be made without departing from the spirit and scope thereof, it is to be understood that the invention is not limited to the specific embodiments thereof except as defined in the appended claims.

What is claimed is:

1. An image storage method comprising:
   an image storage step, of continuously storing a plurality of image data in a first area of a single file;
   a reference information storage step, of storing reference information for accessing a source outside the file, which pertains to each of the plurality of image data stored in said image storage step, in a storage order of the plurality of image data in a second area of the file,
   wherein the reference information includes location information for accessing image data which is a higher resolution version of the corresponding image data stored in the first area, and
   wherein the single file stores both the plurality of image data and the reference information; and
   a feature amount storage step, of assuring a third area in the file, and storing feature amount data including a plurality of components that are utilized for searching the image data stored in the first area in the storage order of the plurality of image data.

2. The method according to claim 1, further comprising a header information storage step, of assuring a fourth area in the file, and storing header information including boundary position information between the first and second areas.

3. The method according to claim 1, wherein said image storage step includes the step of compressing and storing the plurality of image data.

4. The method according to claim 1, wherein the reference information specifies an image file name of an original of the image date stored in the first area.

5. The method according to claim 1, wherein said image storage step includes the step of storing one or a plurality of frame images extracted from moving image data in the first area, and
   said reference information storage step includes the step of storing information that specifies moving image data corresponding to each frame image stored in the first area and a frame position thereof as the reference information in the second area.

6. An image storage apparatus comprising:
   image storage means for continuously storing a plurality of image data in a first area of a single file;
   reference information storage means for storing reference information for accessing a source outside the file, which pertains to each of the plurality of image data stored by said image storage means, in a storage order of the plurality of image data in a second area of the file,
   wherein the reference information includes location information for accessing image data which is a higher resolution version of the corresponding image data stored in the first area, and
   wherein the single file stores both the plurality of image data and the reference information; and
   feature amount storage means for assuring a third area in the file, and storing feature amount data including a plurality of components that are utilized for searching the image data stored in the first area in the storage order of the plurality of image data.

7. The apparatus according to claim 6, further comprising header information storage means for assuring a fourth area in the file, and storing header information including boundary position information between the first and second areas.

8. The apparatus according to claim 6, wherein said image storage means compresses and stores the plurality of image data.

9. The apparatus according to claim 6, wherein the reference information specifies an image file name of an original of the image data stored in the first area.

10. The apparatus according to claim 6, wherein said image storage means stores one or a plurality of frame images extracted from moving image data in the first area, and said reference information storage means stores information that specifies moving image data corresponding to each frame image stored in the first area and a frame position thereof as the reference information in the second area.

11. A storage medium storing an image data file, the image data file comprising:

a first area which continuously stores a plurality of image data;

a second area which stores reference information for accessing a source outside the file, which pertains to each of the plurality of image data stored in the first area, in a storage order of the plurality of image data, wherein the reference information includes location information for accessing image data which is a higher resolution version of the corresponding image data stored in the first area, and wherein the single file stores both the plurality of image data and the reference information; and a third area which stores feature amount data including a plurality of components that are utilized for searching the image data stored in the first area in the storage order of the plurality of image data.

12. The medium according to claim 11, wherein the image data file further comprises a fourth area which stores header information including boundary position information between the first and second areas.

13. The medium according to claim 11, wherein the image data file stored in the first area is compressed.

14. The medium according to claim 11, wherein the reference information specifies an image file name of an original of the image data stored in the first area.

15. The medium according to claim 11, wherein the first area stores one or a plurality of frame images extracted from moving image data, and the second area stores information that specifies moving image data corresponding to each frame image stored in the first area and a frame position thereof as the reference information.

16. A storage medium storing a control program for making a computer implement generation and storage of an image data file, said control program comprising:

code of an image storage step, of continuously storing a plurality of image data in a first area of a single file;

code of a reference information storage step, of storing reference information for accessing a source outside the file, which pertains to each of the plurality of image data stored in the image storage step, in a storage order of the plurality of image data in a second area of the file, wherein the reference information includes location information for accessing image data which is a higher resolution version of the corresponding image data stored in the first area, and wherein the single file stores both the plurality of image data and the reference information; and code of a feature amount storage, step, of assuring a third area in the file, and storing feature amount data including a plurality of components that are utilized for searching the image data stored in the first area in the storage order of the plurality of image data.

\* \* \* \* \*

UNITED STATES PATENT AND TRADEMARK OFFICE
CERTIFICATE OF CORRECTION

PATENT NO. : 6,912,531 B1
DATED : June 28, 2005
INVENTOR(S) : Matsumoto et al.

It is certified that error appears in the above-identified patent and that said Letters Patent is hereby corrected as shown below:

Column 10,
Line 23, "date" should read -- data --.

Column 12,
Line 26, "storage," should read -- storage --.

Signed and Sealed this

Twenty-fifth Day of April, 2006

JON W. DUDAS
*Director of the United States Patent and Trademark Office*